(No Model.) 4 Sheets—Sheet 1.

H. G. WOOD.
PANORAMIC CAMERA.

No. 543,281. Patented July 23, 1895.

WITNESSES:
H. Walker

INVENTOR
H. G. Wood
BY Munn & Co.
ATTORNEYS.

(No Model.) 4 Sheets—Sheet 2.

H. G. WOOD.
PANORAMIC CAMERA.

No. 543,281. Patented July 23, 1895.

WITNESSES:
H. Walker

INVENTOR
H. G. Wood
BY Munn & Co.
ATTORNEYS.

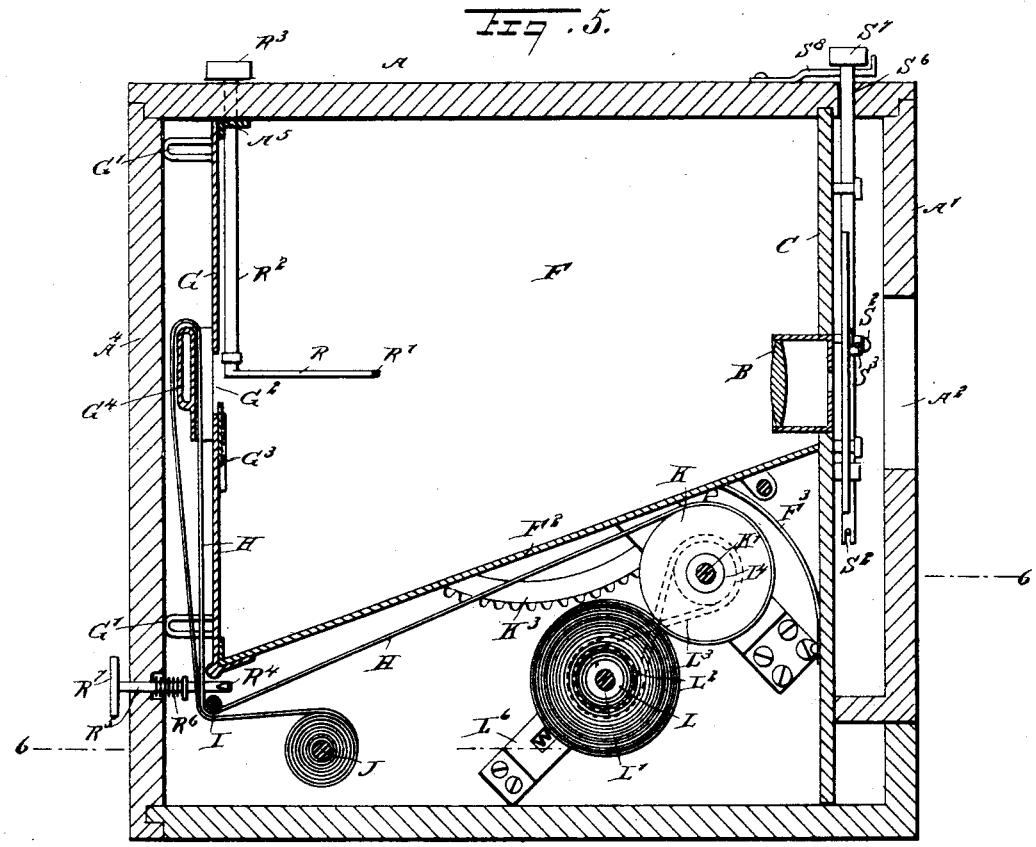

(No Model.) 4 Sheets—Sheet 4.
H. G. WOOD.
PANORAMIC CAMERA.
No. 543,281. Patented July 23, 1895.
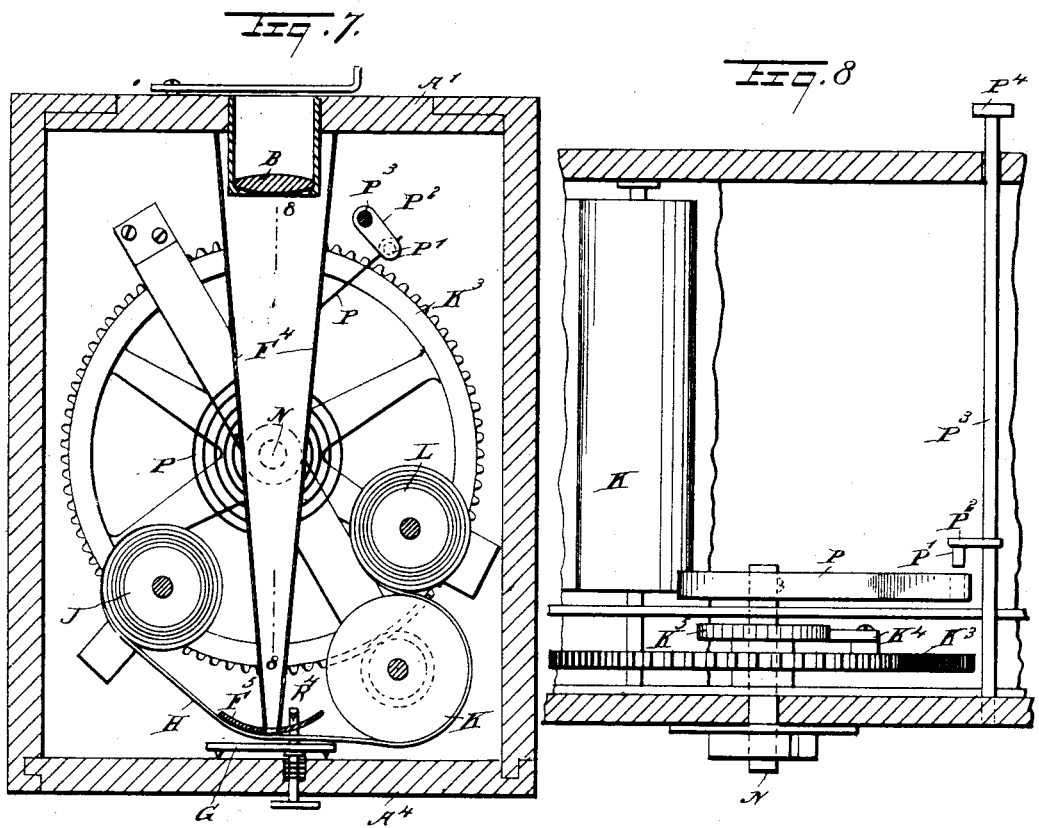
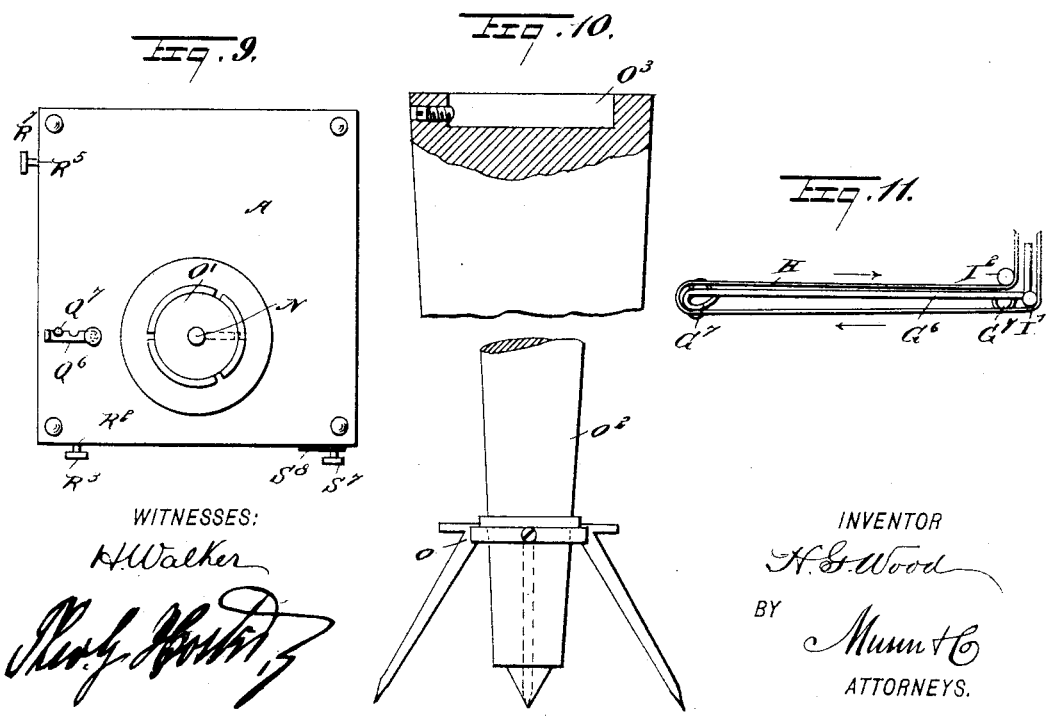
WITNESSES:
H. Walker
INVENTOR
H. G. Wood
BY
Munn & Co.
ATTORNEYS.

Figure # UNITED STATES PATENT OFFICE.

HORATIO GATES WOOD, OF NEWPORT, RHODE ISLAND.

PANORAMIC CAMERA.

SPECIFICATION forming part of Letters Patent No. 543,281, dated July 23, 1895.

Application filed April 12, 1895. Serial No. 545,482. (No model.)

*To all whom it may concern:*

Be it known that I, HORATIO GATES WOOD, of Newport, in the county of Newport and State of Rhode Island, have invented a new and Improved Panoramic Photographic Camera, of which the following is a full, clear, and exact description.

The object of the invention is to provide a new and improved panoramic photographic camera, which is comparatively simple and durable in construction, very effective in operation, and arranged to take and obtain perfect single views or panoramic views either in series or in a continuous view.

The invention consists, principally, of a revoluble camera-casing having a dark chamber, into which extends the lens, a slide in the back of the chamber, and a film-feeding device outside of the said chamber, but within the casing, the said device being adapted to feed the film over the slide either intermittently or continuously, as desired.

The invention also consists of certain parts and details and combinations of the same, as will be fully described hereinafter, and then pointed out in the claims.

Reference is to be had to the accompanying drawings, forming a part of this specification, in which similar letters of reference indicate corresponding parts in all the views.

Figure 1:
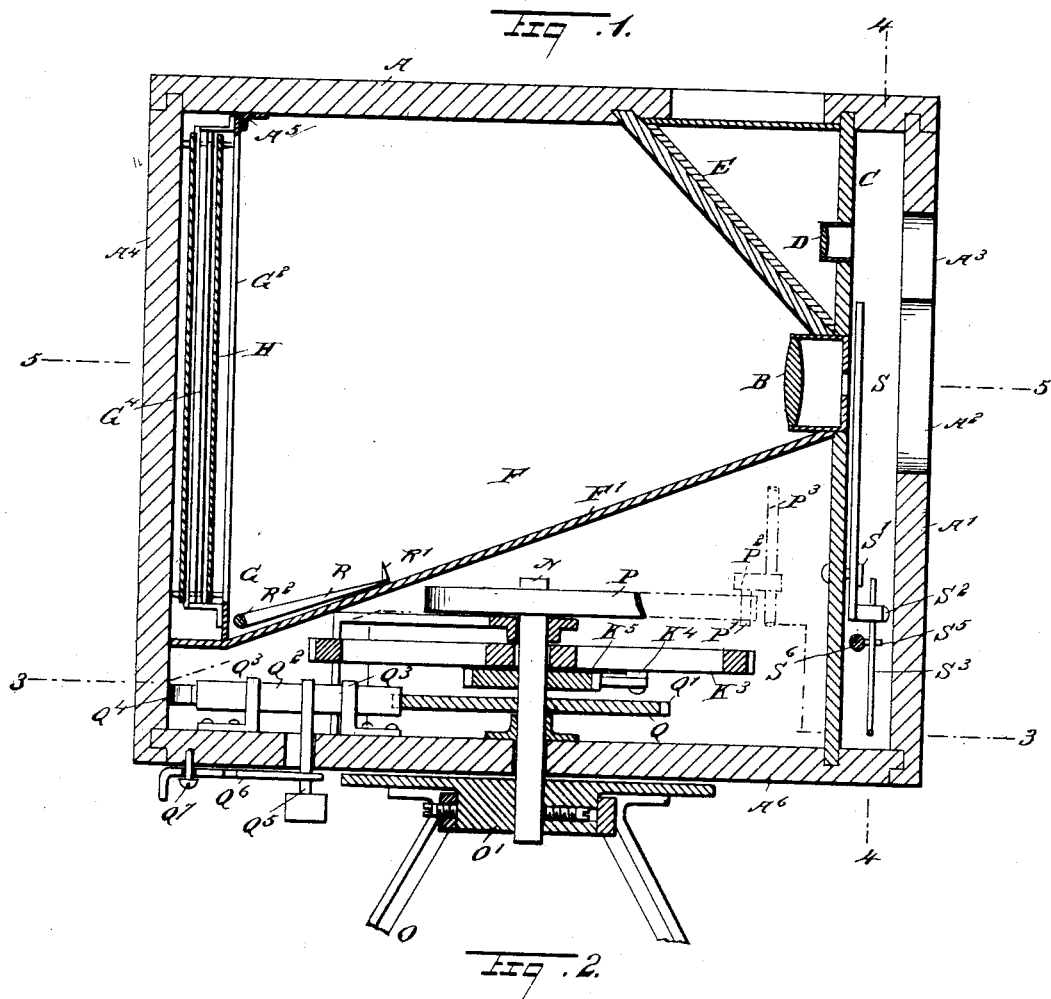
Figure 2:
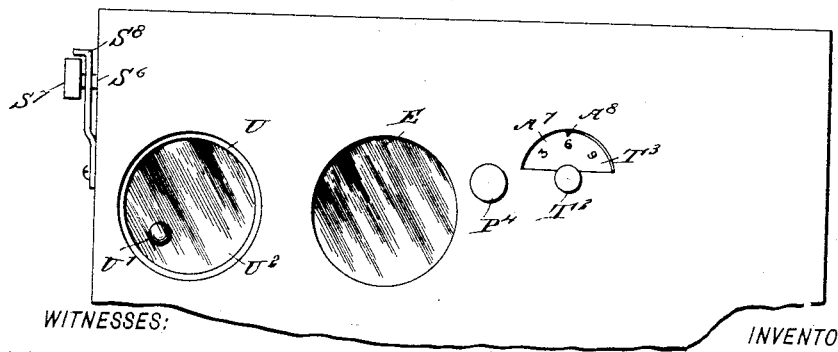
Figure 3:
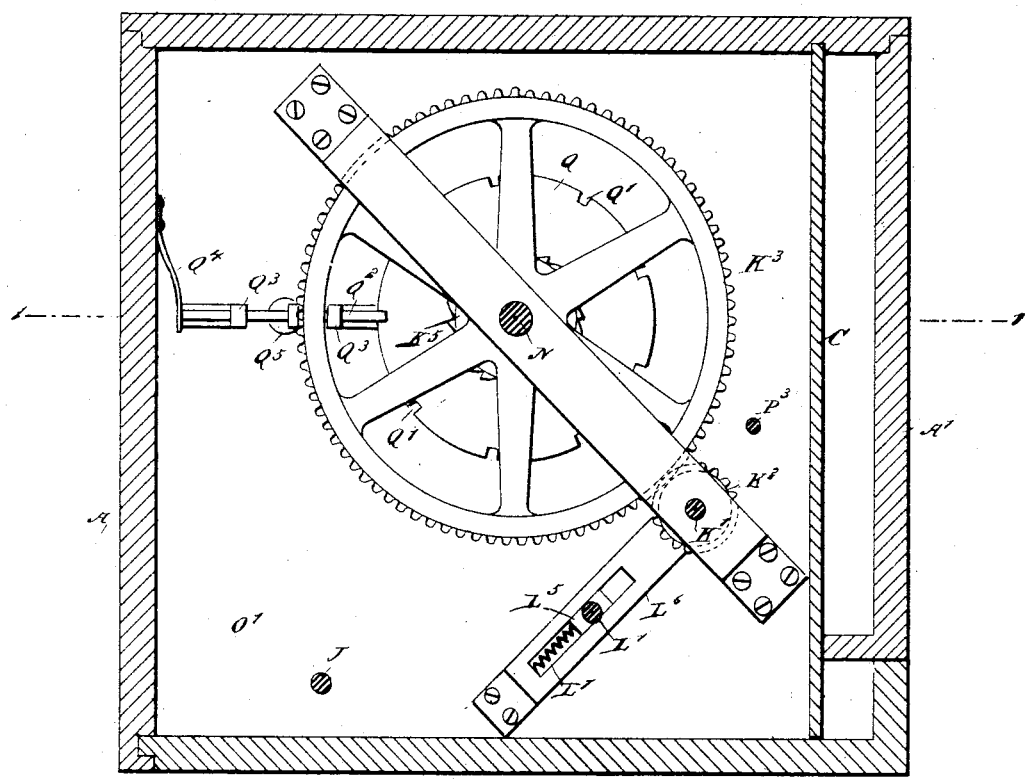
Figure 4:
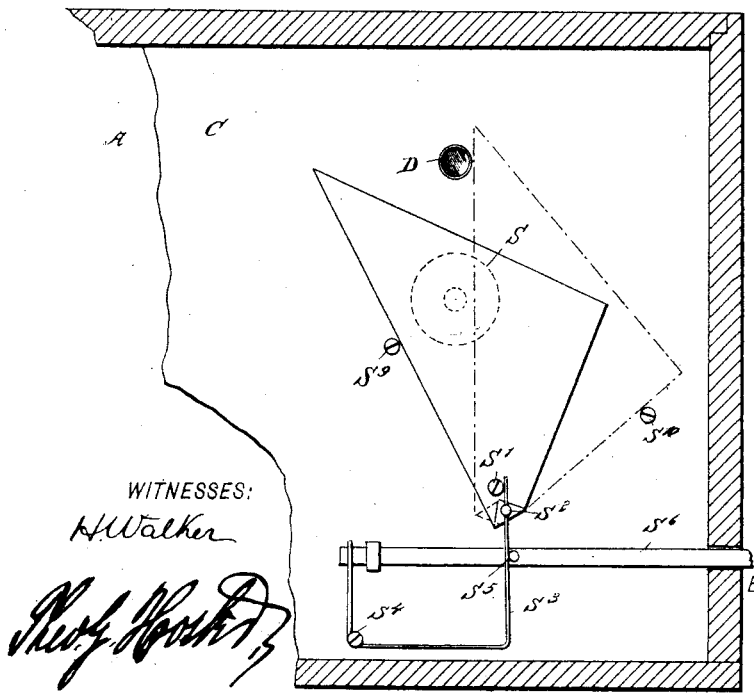

Figure 1 is a sectional side elevation of the camera. Fig. 2 is a plan view of part of the same. Fig. 3 is a sectional plan view of the camera on the line 3 3 of Fig. 1. Fig. 4 is a transverse section of the same on the line 4 4 of Fig. 1, showing the shutter mechanism. Fig. 5 is a sectional plan view of the camera on the line 5 5 of Fig. 1. Fig. 6 is a sectional side elevation of part of the camera. Fig. 7 is a sectional plan view of a modified form of the camera. Fig. 8 is a sectional side elevation of the same. Fig. 9 is a reduced inverted plan view of the camera. Fig. 10 is a side elevation, with part in section, of an extension-tripod; and Fig. 11 is a plan view of a slide for use in making panoramic views in series.

The improved panoramic photographic camera is provided with a camera-casing A, formed in its front A' with openings $A^2$ $A^3$, of which the opening $A^2$ registers with a lens B, secured in a transverse partition C, arranged within the camera-casing A, in the rear of the front A', as is plainly shown in the drawings. The other opening $A^3$ registers with the lens D for a finder E of the usual construction, to permit the user of the camera to view the picture from the top of the casing in the usual manner. The lens B projects into a dark chamber F, arranged within the camera-casing A and formed with an inclined bottom F' and a correspondingly-arranged side $F^2$, as will be readily understood by reference to Figs. 1 and 5, the back of the dark chamber being the rear end $A^4$ of the casing and the other side and top of the chamber being formed by the corresponding side and top of the casing A.

In the chamber F and at the rear end thereof is held removably a slide G, over which is adapted to pass the film H, prepared in the usual manner and adapted to form the negative of the picture to be taken by the camera, irrespective of whether the said picture is to be produced by a snap-shot or in the form of a panoramic view, continuous or in series, as hereinafter more fully explained.

The slide G is preferably made removable, and different slides are used for making snap-shots and panoramic views in series or continuous panoramic views. As shown in Figs. 1 and 5, the slide G is to be used for making a continuous panoramic view, and this slide is fitted at one side against a stop $A^5$, secured to the inside of the casing A, and at its other side abuts the inner end of the side $F^2$ of the dark chamber F. The slide G is provided at its back and at or near each corner with a bent wire G', forming a rest adapted to abut against the inner surface of the back $A^4$ of the camera-casing.

In the slide G and in alignment with the center of the lens B is arranged a slot $G^2$ disposed vertically and adapted to be increased or decreased in width by a plate $G^3$ fitted to slide transversely in suitable bearings attached to the upper and lower end of the slide G, as will be readily understood by reference to the drawings.

The film H passes over a guide $G^4$, disposed vertically and forming part of the slide G, but in the rear of the slot $G^2$, so that the film H in passing over this guide $G^4$ is exposed to the rays of light passing through the lens B and slot $G^2$ from the outside of the camera. The film H passes over a vertically-disposed rod I, secured in the camera-casing outside the chamber F, as is plainly shown in Fig. 5, and the said film unwinds from a roller J, disposed vertically in the camera-casing, as plainly indicated in Fig. 5, the film passing from the said roller J over the rod I and guide G⁴ to pass in the rear of the slot G² and then back to the rod I, to then pass over a spool K, secured on a shaft K', mounted to turn in suitable bearings attached to the top and bottom of the camera-casing A. The film H, after leaving the roller K, passes upon a roller L for winding up the exposed part of the film, the said roller being secured on a shaft L' provided with a pulley L² connected by a belt L³, of rubber or other suitable material, with a pulley L⁴ secured on the shaft K' of the roller K.

The shaft L' is journaled in bearings L⁵ fitted to slide in bearings L⁶, and pressed on by springs L⁷, so that the roller L is pressed in the direction of the roller K to cause the film H to be pressed tightly in position on the roller K and the roller L. Thus when the film is wound up on the roller L to increase the diameter of this roller, the springs L⁷ yield sufficiently to permit the roll to increase in diameter without, however, moving the film out of contact with the roller L at the contact-points of the layer of film on the roller K and the layer over the roller L.

The roller K is provided on its shaft K' with a gear-wheel K² in mesh with a larger gear-wheel K³, mounted to rotate loosely on a shaft N, secured in a disk O', attached by screws or other means in the upper end of the tripod O, as is plainly shown in Fig. 1. The gear-wheel K³ carries on its face a spring-pressed pawl K⁴ in mesh with a ratchet-wheel K⁵, secured on the shaft N, so that when the camera-casing A is turned by the operator in one direction the gear-wheels K² and K³ will simply roll off without turning the roller K; but when turned in an opposite direction the roller K is rotated to exert a pull on the film H to wind up the latter on the roller K and to unwind the same from the spool J, the film then passing over the guide G⁴ during the exposure, as hereinafter more fully described.

After the camera has been revolved, and when it is desired to return it to the normal position, this return may be effected either by revolving the casing manually or by means of a coil-spring P, secured at its inner end to the shaft N and having its outer end removably fastened to a pin P' through the medium of an eye formed on said end. The pin P' is attached to an arm P², which is in turn connected to a rod P³, fitted to slide vertically in suitable bearings in the casing A, and the upper end of the said rod P³ is provided with a button P⁴, whereby the rod may be moved longitudinally. Thus when the parts are so connected the revolution of the camera in the operation of photographing results in the coiling up of the spring P, and when the first revolution has been completed and it is desired to return the camera the said spring will react and return the camera by uncoiling. Should it be desired to effect the return of the camera by manual means, the rod P³ may be moved upwardly, so as to disengage the pin P' and the coil-spring, whereupon the coil-spring will be inoperative and will have no effect on the operation of the device.

On the shaft N is also secured a wheel Q, provided in its periphery with notches Q', about nine in number, and placed equal distances apart, the notches being adapted to be engaged by a bolt Q², fitted to slide longitudinally in bearings Q³, attached to the upper surface of the bottom A⁶ of the casing A. The rear end of the bolt Q² is pressed on by a spring Q⁴, so as to engage the said bolt with a notch Q' whenever the latter registers with the front end of the bolt.

The bolt is provided with a downwardly-extending knob Q⁵ passing through a slot in the bottom A⁶ and engaged by an arm Q⁶, formed with two notches, either of which can be moved in engagement with a pin Q⁷, secured to the under side of the bottom A⁶. By pulling the arm Q⁶ the bolt Q² may be withdrawn from the corresponding notch in the wheel Q to permit the casing A to be revolved either by hand or by a spring-power, as previously described, and either for a full revolution or for only part of the same, as the case may be. Thus, when the bolt Q² is withdrawn from a notch by pulling on the arm Q⁶, then, on releasing the said arm and turning the casing A, the latter will revolve one-ninth of a revolution, as the bolt Q² will snap into the next notch Q' in the wheel Q to fasten the camera-casing in place relative to the shaft N.

In order to mark the film H after a view, whether in the form of a snap shot, serial panoramic view, or continuous panoramic view has been taken, I provide a marker R for the continuous panoramic view, this marker being provided with a point R', and secured on a transversely-extending shaft R², mounted to turn in suitable bearings arranged on the bottom F' and one side of the casing A. The outer end of this shaft R² is provided with a button R³, under the control of the operator, to permit the latter to turn the shaft R² to swing the point R' in contact with that part of the film passing over the guide G⁴ to punch a hole in the film, thus indicatnig the end of the picture taken at one revolution of the camera.

For snap shots and serial panoramic views I provide a marker R⁴, having a point and secured on a rod R⁵, mounted to slide in the back A⁴ of the casing and adapted to engage the film at or near the rod I to mark the same. The rod R⁵ is pressed on by a spring R⁶ to normally hold the marker out of contact with the film, and on the outer end of the said rod is arranged a button R⁷, under the control of the operator, to pull the marker R⁴ in contact with the film after a picture has been taken.

A shutter S for the lens B is arranged between the front A' and the partition C, and this shutter is preferably made of a piece of sheet metal triangular in shape, as indicated in Fig. 4, and is pivoted at its lower corner at S' on the front face of the partition C. A pin $S^2$ projects from the shutter S below the pivot S', and this pin $S^2$ is engaged by the free end of a spring-wire $S^3$, secured at $S^4$ to the partition C. The wire $S^3$ is preferably made U-shaped, with its front end resting against a projection $S^5$ on a rod $S^6$, mounted to slide transversely in suitable bearings in the casing, one end of the said rod extending through the side of the casing to carry at its outer end a knob $S^7$ adapted to be locked in place by a spring-catch $S^8$.

Now, by reference to Fig. 4 it will be seen that the shutter S normally is in a closed position resting with one side on a stop $S^9$, and when the operator presses on the knob $S^7$ the spring $S^3$ causes the shutter S to swing into an open position, as indicated in dotted lines in Fig. 4, with the opposite side of the shutter abutting against a stop $S^{10}$. (See Fig. 4.) As soon as the operator releases the pressure on the knob $S^7$ the shutter S again flies shut by the action of the spring $S^3$. If desired the shutter may be locked in an open position by the catch $S^8$, previously mentioned.

As illustrated in Fig. 7, the dark chamber F may be made in the form indicated—that is, having two side walls $F^4$ diverging so as to form at the rear end a narrow slot in a curved plate $F^5$, over which passes the film H from the spool K to the roller J and winding up on the roller L. In this case the slide is simply represented by a single plate G resting on the back $A^4$ of the camera-casing.

As shown in Fig. 11, the slide to be used in the camera-casing is arranged for snap-shots or panoramic views in series, and in this case the slide $G^6$ is without a slot, and the film H, passing over the front of the slide $G^6$, is exposed to the action of the rays of light passing through the lens, it being understood that the film is moved continuously while the camera revolves part of a revolution, as previously described, so that the film will present that new surface to the rays of light which is essential to the operation of the camera. The slide $G^6$ is provided with rests $G^7$ and vertical rods $I'$ $I^2$, over which passes the film to guide the latter over the front of the slide, as previously explained.

As shown in Fig. 10, the tripod O is used with an extension $O^2$ in the shape of a conical post formed at its upper base end with a recess $O^3$, adapted to receive the disk $O'$, carrying the shaft N. This extension-tripod is very desirable at times to elevate the camera-casing a sufficient distance above the part on which the tripod O is supported.

When taking snap-shots or panoramic views in series, it is desirable to indicate to the operator the position of the wheel Q, and consequently that of the film; and for this purpose I provide the shaft $K'$ of the roller K with a gear-wheel $K^6$ in mesh with a gear-wheel T, secured to a shaft $T'$ journaled in the top of the casing A. On the outer end of this shaft $T'$ is secured a knob $T^2$ under the control of the operator, and on this shaft is also secured a dial $T^3$ in a recess in the top of the casing and adapted to appear in a slot $A^7$ leading to the said recess, as shown in Figs. 2 and 6. A pointer $A^8$, fixed in the top of the casing, indicates on the numerals marked on the dial $T^3$, so that the operator can see at a glance the position the film has relative to the slide G.

When it is desired to use the apparatus for making a continuous panoramic view, the operator gives a full turn to the camera-casing A at the time the shutter S is opened and locked in position by the catch $S^8$, so that the film H is drawn over the guide $G^4$ by the action of the roller K rotated by the gear-wheel $K^3$, as previously explained. Thus the film is wound up on the roller L and unwound from the roller J and drawn over the guide $G^4$ during the exposure, after which the shutter is closed to prevent further light passing into the dark chamber F. The operator now turns the knob $R^3$ to mark with the point $R'$ the film at the end of the picture, after which the camera-casing can be again turned for a second full revolution to take another continuous panoramic view.

For taking panoramic views in series or sections I make use of the bolt $Q^2$ in the manner previously described, so that the camera rotates part of a revolution, and a corresponding amount of film is passed over the guide $G^4$ for this view. The picture is then marked at or near the rod I by the marker $R^4$.

In the top of the camera-casing A is arranged a level U, for properly leveling the casing, and is preferably made with a ball $U'$, held loosely in a chamber formed in the top of the casing and having a plane bottom parallel with the top of the casing A, a glass plate $U^2$ being arranged over the chamber, as plainly indicated in Fig. 2.

It will be seen that as long as the ball $U'$ does not roll about on the circular plate $U^2$ the camera is not leveled, and when the ball rolls from side to side the operator will know that further adjustment is necessary.

It will be observed that in my invention the axis of the casing and that on which the casing swings in the operation of photographing is not aligned with the axis of the lens as in other devices of its class, but is midway between the lens and the film. By this arrangement my invention operates on a principle different from those which have an axis equal to the axis of the lens, since with my invention the lens moves to an extent equal to the movement of the film, and both are timed so that a new surface on the film will be presented to the rays of light as fast as they are changed in the lens.

Having thus fully described my invention, I claim as new and desire to secure by Letters Patent—

1. A panoramic, photographic camera, comprising a revoluble camera casing, provided with a dark chamber and a lens, a removable slide in the back of the said chamber and having a slot adapted to be opened wide or partly closed by a plate, the said slide being also provided with a guide in the rear of the said slot, and a feeding device outside of the said chamber and within the casing, the said device being adapted to feed the film over the said slide guide, substantially as shown and described.

2. A panoramic, photographic camera, provided with a removable guide formed with a vertically-disposed slot, a plate held adjustable on the said guide over the said slot, and a guide forming part of the said plate and arranged in the rear of the said slot, substantially as shown and described.

3. A panoramic, photographic camera, comprising a camera casing, a shaft on which the said casing is mounted to turn, a ratchet wheel secured on the said shaft, a gear wheel carrying a pawl engaging the said ratchet wheel, a film feeding roller having a gear wheel in mesh with the said pawl gear wheel, a notched wheel secured on the said shaft, and a spring-pressed bolt under the control of the operator, and adapted to engage the notches in the said wheel, substantially as shown and described.

4. In a photographic camera, a casing mounted capable of rotary movement, a dark chamber within the casing, a lens, a spur wheel fast on the axis of the camera, a film roller revolved by the spur wheel, and a second film roller co-operating with the first, substantially as described.

5. In a photographic camera, a revolubly mounted casing, a dark chamber contained therein, a lens within the casing, the dark chamber having a slot formed in one side, a guide outside of the dark chamber and directly opposite the slot, a roller capable of carrying the film, a second roller for unwinding the film on the first roller, said second roller having movable bearings, springs for pressing on the bearings of the second roller, an idler roller against which the second roller is pressed by the springs of its bearings, and a spur wheel fixed on the axis of the camera and meshing with the idler roller, substantially as described.

6. In a photographic camera, a casing mounted capable of rotary movement, a dark chamber within the casing a lens, film feeding mechanism, a disk fixed to the axis of the casing and having peripheral notches therein, and a spring-pressed bolt within the casing and operating with the notches of the disk, substantially as described.

7. In a photographic camera, having a casing, a dark chamber within the casing, a lens, film feeding mechanism, a shaft revolubly mounted within the dark chamber and projecting outside of the casing, and an arm fixed to the shaft and having a spur on its extremity, said spur being capable of movement with the shaft to mark the film, substantially as described.

8. In a photographic camera, a casing mounted capable of rotary movement, a dark chamber contained within the casing, a lens, film feeding mechanism, a coil spring fixed to the axis of the casing and having an eye at its free end, a vertically movable rod within the casing, an arm projecting therefrom, and a pin fixed to the arm and capable of removable connection with the eye on the spring, substantially as described.

9. In a photographic camera, a casing mounted capable of rotary movement, a dark chamber within the casing, a lens, film feeding mechanism, a coil spring fixed to the axis of the casing, a vertically movable rod in the casing, and a pin on the rod and capable of removable connection with the free end of the coil spring, substantially as described.

10. In a photographic camera, a casing mounted to be capable of rotary movement, a dark chamber within the casing, a lens, film feeding mechanism, a coil spring having one end fixed to the axis of the casing, and a vertically movable pin in the casing and capable of removable connection with the free end of the coil spring, substantially as described.

11. In a photographic camera, a casing mounted capable of rotary movement, a dark chamber within the casing, a lens, a slide forming one side of the dark chamber and having a slot therein, the said slot and the lens being arranged on opposite sides of the axis of the casing and at equidistant points therefrom, and film feeding mechanism capable of passing the film by the slot in the slide, substantially as described.

12. In a photographic camera, a revolubly mounted casing, a dark chamber within, a lens, film feeding mechanism, a disk fixed to the axis of the casing and having peripheral notches formed therein, a spring-pressed bolt capable of movement toward and from the disk and operating with the notches therein, a knob fixed to the bolt and projecting outside of the casing, and an arm mounted outside of the casing and capable of removable connection with the knob, substantially as described.

13. In a photographic camera, a casing having a lens orifice, a shutter pivotally mounted on the casing and capable of swinging to open and close the lens orifice, a spring fixed to the casing and having a sliding connection with the shutter, the tendency of the spring being to keep the shutter over the lens orifice, and a reciprocal rod mounted in the casing and having a pin thereon capable of engagement with the spring and of moving the same against its tendency, substantially as described.

HORATIO GATES WOOD.

Witnesses:
BENJAMIN MARSH, 2d,
ALMIRA F. HARRIS.